United States Patent

[11] 3,613,988

[72] Inventors James S. Tapp
 Kettering, Ohio;
 Robert E. Colwell, Simsbury, Conn.;
 Myron K. Toney, Greenwood, S.C.
[21] Appl. No. 808,604
[22] Filed Mar. 19, 1969
[45] Patented Oct. 19, 1971
[73] Assignee Monsanto Company
 St. Louis, Mo.

[54] CONTROLLED-FORM CENTRIFUGAL PRECIPITATION APPARATUS
 4 Claims, 1 Drawing Fig.
[52] U.S. Cl. .................................................. 233/2,
 233/21
[51] Int. Cl. ............................................... B04b 3/00
[50] Field of Search .......................................... 233/2, 16,
 17, 18, 19, 20, 21

[56] References Cited
UNITED STATES PATENTS
1,750,860 3/1930 Rawlings ...................... 233/18

*Primary Examiner*—William T. Price
*Attorneys*—Thomas Y. Awalt, Jr. and Robert L. Broad, Jr.

ABSTRACT: An apparatus for controlling the form of a precipitate is comprised of two coaxially rotating cuplike containers so disposed and shaped that centrifugal force causes spillage of the contents of one container to contact spillage of the contents of the other container. The device is also provided with supply means for each of the containers, collection means for the liquids centrifuged from the containers and the solids precipitated during the centrifuge operation, and means for separating the precipitated solids from the centrifuged liquids.

3,513,988
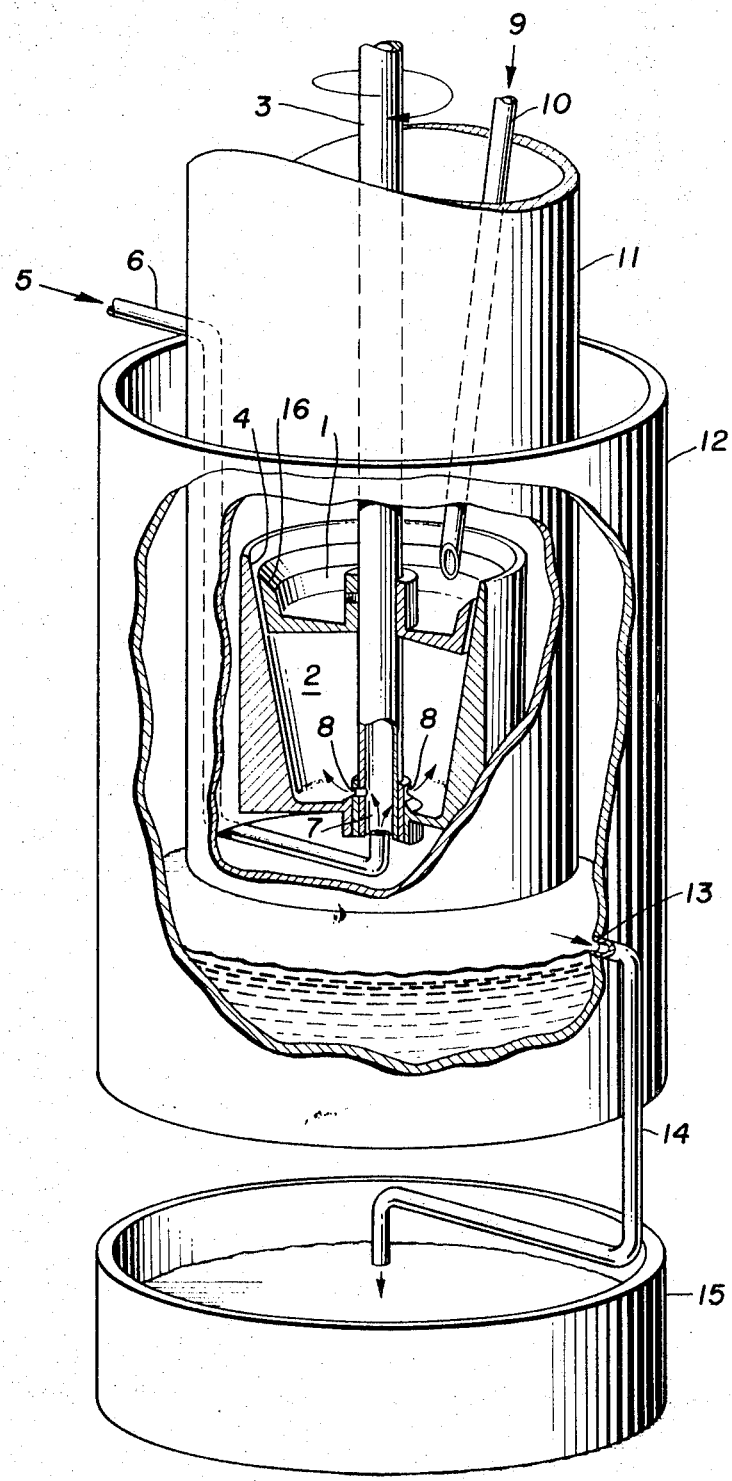
INVENTORS
JAMES S. TAPP
ROBERT E. COLWELL
MYRON K. TONEY
BY
ATTORNEY

CONTROLLED-FORM CENTRIFUGAL PRECIPITATION APPARATUS

This invention relates to the field of centrifuges and controlled precipitation devices.

Synthetic materials with a pronounced resistance to degradation by heat and by electrical discharge are enjoying wider use in many commercial applications, such as dielectrics, reinforcements, nonwovens, synthetic leather, coatings, composites and the like. In many cases, the performance of a product is largely dependent upon its physical form as well as its composition. Usually particulate form is controlled under conditions of high shear. See, for example U.S. Pat. No. 2,342,387 which teaches the production of polymeric granules.

It has been found that particulate materials, and particularly of synthetic polymers can be produced under conditions of low shear by the apparatus of this invention, and that such particular materials are useful in the preparation of colorable-shaped objects, nonwovens, textiles, friction surfaces, laminates, and the like. It has also been found that by adjusting the apparatus and process conditions of this invention, morphological structures of these particulate materials can be controlled. Various material structures include (1) spheroidal particles, (2) fiberlike ligaments, and (3) sheets or films, all of which have broad utility in the field of composites. For example, spheroids are well-suited in composite molding; ligaments are useful as binders in thin-sheet composites, and sheets are popular in thermal or electrical insulating composites.

The apparatus can be used for any precipitation system and is especially suitable for polymer systems comprising a polymer solution and a nonsolvent which will yield a precipitate. These systems include polyamides, acrylics, ordered temperature resistant polyamides, and the like.

It is an object of this invention to produce an apparatus whereby a pregnant solution and a precipitant can be subjected to centrifugal action whereby controlled amounts of the solution and the precipitant are thrown into a random contact, thereby causing a precipitate to form.

It is another object of this invention to provide an apparatus whereby control can be maintained of the specific form of precipitate from its solution.

Briefly, the objects of this invention are accomplished in a centrifugal precipitation apparatus comprising two coaxially rotating cuplike containers so disposed and shaped that when spillage of contents is caused by centrifugal force, small amounts of the contents of one container come in contact with small amounts of the contents of the other container. The desired spillage contact can be assured by the shape of the container with particular respect to the configuration of the lips of the container and the relative position of the containers to one another.

Each container is provided with supply means, and the precipitate and the excess of liquids centrifuged are collected and separated as required.

To further understand the invention, reference will be made to the attached drawing that forms a part of the present application.

In the drawing, the figure is a partially cut away perspective view of a preferred embodiment of the apparatus of this invention.

Other objects and advantages of this invention will be apparent from the description which follows:

Containers 1 and 2 are coaxially mounted on shaft 3, their conical lips being represented by numerals 16 and 4, respectively. Container 2 is fed from supply source 5 through tube 6, through the hollowed out portion of shaft 3 designated as numeral 7, and through apertures 8. Container 1 is fed from supply source 9 through tube 10. The containers are surrounded by sleeve 11 which projects high enough to control splashing and splattering to within the device. The major portion of sleeve 11 is surrounded by vessel 12 which is provided with overflow aperture 13. Connected with the overflow aperture is overflow tube 14 which provides conduit means to filtration unit 15.

In the operation of this device, shaft 3 rotates at a speed which in conjunction with variables including the composition of the solution and precipitant, and the rate of feed thereof, is adjusted to produce the morphology desired of the precipitate which is formed generally at the point, and beyond the point where random amounts of the precipitant and the solution meet within the sleeve. Besides the speed of rotation, the clearance between the outside of container 1 and the inside of container 2, where container 1 is disposed within container 2, and in any case, the location of the point of intersection of hypothetical extensions of cone-shaped lips 4 and 16, may be critical to the morphology of the precipitate. These are variables, but it is always essential that there is concentric uniformity of spacing between the containers so as to provide a balanced precipitating system.

In the preferred embodiment, the spillage of the contents of cups 1 and 2 are (1) brought into contact by the positioning of container 1 within container 2 so that spillage from container 1 will come in contact with prospective spillage from container 2 along the inner walls of container 2; and (2) spillage contact is made more uniform by the disposition of conical lips of both containers being such that hypothetical conical extensions of each of said lips would intersect to form a circle coaxial with the containers. Either or both of these characteristics can be incorporated into the device to insure proper contact of spillage. Alternatively, the spillage contact can be made along the interior walls of sleeve 11. However, the positioning of one container within the other and/or the convergence of extensions of conical-shaped lips are preferred and provide easier means of adjusting the device to produce the desired morphological structure of the precipitate.

It may be desirable to provide wetting means for the interior surface of sleeve 11 in order to prevent accumulations of the precipitate thereon. Although not shown in the figure, this can be accomplished by directing flow of the precipitant either downward from the top of the sleeve along the interior surface, or upwards from the bottom of the sleeve. The source of the precipitant for the wetting of the interior of the sleeve may be a recirculation of the precipitant from filtration unit 15; or a fresh supply may be used.

Control of the rate of feed to each of the containers from the supply source is essential to the selection of conditions producing the desired morphology. Variations in the distance between containers or the clearance between lips of the containers will likewise affect the morphology of the precipitate.

It is understood that the example given in the specification is intended only by way of illustration, and that it may be modified in many details without departing from the spirit of the invention.

We claim:

1. A controlled-form centrifugal precipitation apparatus comprising:
    1. A first axially rotatable cuplike container;
    2. A second axially rotatable cuplike container;
        Said containers being so disposed and shaped that centrifugal force applied to liquid contents thereof causes spillage of the contents of said first container to contact spillage of the contents of said second container;
    3. Supply means for each of said containers;
    4. Collection means for liquids centrifuged from said containers and for solids precipitated therefrom;
    5. Means for coaxially rotating said containers; and
    6. Means for separating said precipitated solids from said liquids.

2. The controlled-form centrifugal precipitation apparatus of claim 1 wherein one of said containers is coaxially positioned within the other container;

3. The controlled-form centrifugal precipitation apparatus of claim 1 wherein said cuplike containers have generally conical lips so disposed that hypothetical conical extensions of each of said lips would intersect to form a circle coaxial with said containers.

4. The controlled-form centrifugal precipitation apparatus of claim 1 wherein said collection means comprises a cylindrical member surrounding said containers, a generally cylindrical vessel surrounding said cylindrical member and having an overflow exit port below the uppermost of said containers, a filter, and tubular conduit means from said overflow port to said filter.